United States Patent [19]

Goode, III et al.

[11] Patent Number: 5,896,098
[45] Date of Patent: *Apr. 20, 1999

[54] SELF-CONTAINED MULTIFUNCTIONAL LCD FLIGHT INDICATOR

[75] Inventors: Joseph W. Goode, III, Lawrenceville; James E. Strickling, III, Duluth, both of Ga.

[73] Assignee: Advanced Displays Corporation, Norcross, Ga.

[*] Notice: This patent is subject to a terminal disclaimer.

[21] Appl. No.: 08/948,000

[22] Filed: Oct. 9, 1997

Related U.S. Application Data

[63] Continuation of application No. 08/653,825, May 28, 1996, Pat. No. 5,736,922, which is a continuation of application No. 07/998,943, Dec. 30, 1992, abandoned.

[51] Int. Cl.⁶ ............................................. G01C 21/00
[52] U.S. Cl. ........................... 340/974; 340/971; 340/975; 340/979
[58] Field of Search .................... 340/961, 971, 340/973, 975, 977, 945, 979, 984, 974; 345/87, 102; 359/83, 48, 49, 50; 701/3, 4, 8, 9

[56] References Cited

U.S. PATENT DOCUMENTS

| | | | |
|---|---|---|---|
| 3,418,459 | 12/1968 | Purdy | 395/143 |
| 3,521,227 | 7/1970 | Congleton et al. | 340/979 |
| 4,208,719 | 6/1980 | Lotz | 395/143 |
| 4,312,041 | 1/1982 | De Jonge | 340/971 |
| 4,365,869 | 12/1982 | Hareng et al. | 350/345 |
| 4,453,200 | 6/1984 | Trcka et al. | 362/31 |
| 4,532,513 | 7/1985 | Halvorson | 358/254 |
| 4,545,070 | 10/1985 | Miyagawa | 345/118 |
| 4,570,233 | 2/1986 | Yan | 345/118 |
| 4,581,612 | 4/1986 | Jones | 340/791 |
| 4,583,094 | 4/1986 | Mosier | 340/975 |
| 4,623,880 | 11/1986 | Bresenham | 345/118 |
| 4,649,322 | 3/1987 | Tellan et al. | 315/306 |
| 4,649,381 | 3/1987 | Masuda et al. | 340/784 |
| 4,687,072 | 8/1987 | Komura | 180/219 |
| 4,748,546 | 5/1988 | Ukrainsky | 362/223 |
| 4,763,119 | 8/1988 | Matsubara | 395/133 |
| 4,798,426 | 1/1989 | Malcolm et al. | 350/3.7 |
| 4,826,294 | 5/1989 | Imoto | 350/345 |
| 4,835,447 | 5/1989 | Mizuno et al. | 315/169.1 |
| 4,840,460 | 6/1989 | Bernot et al. | 450/333 |
| 4,845,495 | 7/1989 | Bollard et al. | 340/973 |
| 4,910,513 | 3/1990 | Kelly et al. | 340/975 |
| 4,945,350 | 7/1990 | Kawamura | 340/784 |
| 4,958,915 | 9/1990 | Okada et al. | 350/345 |
| 4,974,122 | 11/1990 | Shaw | 362/31 |
| 4,980,683 | 12/1990 | O'Sullivan et al. | 340/961 |
| 4,988,995 | 1/1991 | Buisson et al. | 340/971 |
| 4,988,996 | 1/1991 | Ito | 340/984 |
| 4,998,045 | 3/1991 | Ruby | 315/209 R |
| 5,019,808 | 5/1991 | Prince et al. | 340/765 |
| 5,030,887 | 7/1991 | Guisinger | 315/158 |
| 5,030,943 | 7/1991 | Anglin | 340/716 |
| 5,037,166 | 8/1991 | Malcolm et al. | 359/15 |
| 5,041,823 | 8/1991 | Johnson et al. | 340/784 |
| 5,043,727 | 8/1991 | Ito | 340/984 |
| 5,061,920 | 10/1991 | Nelson | 340/794 |
| 5,078,476 | 1/1992 | Shin | 359/48 |

(List continued on next page.)

OTHER PUBLICATIONS

Kater, D. & Thomas S., *TRS–80 Graphics*, Kingsport Press, 1982, pp. 38–43.

*Primary Examiner*—Brent A. Swarthout
*Attorney, Agent, or Firm*—Standley & Gilcrest

[57] ABSTRACT

A liquid crystal display flight indicator unit having the capability to display a horizontal situation indicator (HSI) or an attitude direction indicator (ADI) on the viewing area of the same unit. Signals from existing aircraft electronics are processed to determine whether the incoming signal is an HSI or ADI graphical image to be displayed on the viewing area. A unique component layout is described to enable HSI and ADI to be contained within a unit having a chassis size not larger than previously known HSI and ADI units.

3 Claims, 12 Drawing Sheets

U.S. PATENT DOCUMENTS

| | | | |
|---|---|---|---|
| 5,121,233 | 6/1992 | Spencer et al. | 359/48 |
| 5,126,865 | 6/1992 | Sarma | 359/59 |
| 5,128,783 | 7/1992 | Abileah et al. | 359/49 |
| 5,130,907 | 7/1992 | Tortola et al. | 362/109 |
| 5,136,301 | 8/1992 | Bechtold et al. | 342/176 |
| 5,143,433 | 9/1992 | Farrell | 362/29 |
| 5,147,127 | 9/1992 | Honda et al. | 362/23 |
| 5,164,849 | 11/1992 | Evans et al. | 359/45 |
| 5,191,792 | 3/1993 | Gloor | 340/979 |
| 5,195,177 | 3/1993 | Kamiyashi | 345/118 |
| 5,195,822 | 3/1993 | Takahashi et al. | 362/296 |
| 5,208,590 | 5/1993 | Pitts | 340/973 |
| 5,214,522 | 5/1993 | Tagawa | 359/49 |
| 5,303,321 | 4/1994 | Peaslee | 395/133 |
| 5,440,324 | 8/1995 | Strickling, III et al. | 345/2 |
| 5,467,085 | 11/1995 | Dunn | 340/971 |
| 5,479,328 | 12/1995 | Lee et al. | 362/216 |
| 5,648,827 | 7/1997 | Shaw | 349/61 |

SOFTWARE - FUNCTIONS

- Microcontroller

√   Bezel Controls Interface

√   Elapsed Time

√   BIT

√   System I/O Interface

√   RS-232 Communications

√   Host to Graphics Proc.

√   Temperature Sensor

√   Heater and Backlight Control

FIG. 5C

SOFTWARE - FUNCTIONS

- Graphics Processor

√   ADI and HSI Displays

√   Real Time Update (20Hz)

√   Controls all Graphic Displays

FIG. 5D

BUILT-IN-TEST (BIT)

- Three levels of BIT

√   Continuous

√   Power-up

√   Initiated

FIG. 5E

BUILT-IN-TEST (BIT)

- Continuous BIT

√   Watchdog Timer

√   Power Supply Monitor

√   Memory periodic checks

√   Graphics Proc. status

√   Synchro / Digital status

FIG. 5F

BUILT-IN-TEST (BIT)

- Power-up BIT

√   Abbreviated Tests

√   Power Supply Monitor

√   Memory Tests

√   Graphics Proc. Test

√   Micro Internal Functions

FIG. 5G

BUILT-IN-TEST (BIT)

- Initiated BIT

√   Initiated via Front Panel Test Button or RS-232 Terminal

√   More extensive tests on all circuits

√   RS-232 has the most capability and flexibility for user

√   RS-232 could be considered for bench debug and repair

FIG. 5H

SELF-CONTAINED MULTIFUNCTIONAL LCD FLIGHT INDICATOR

This application is a continuation of application Ser. No. 08/653,825 filed May 28, 1996, now U.S. Pat No. 5,736,922 entitled SELF-CONTAINED MULTIFUNCTIONAL LCD FLIGHT INDICATOR. U.S. application Ser. No. 08/653,825 is a continuation of U.S. application Ser. No. 07/998,943, filed Dec. 30, 1992.

BACKGROUND AND SUMMARY OF THE INVENTION

The present invention relates generally to electronic display guidance indicators, and more particularly, to an electronic liquid crystal display indicator capable of displaying more than one type of guidance indicator in the same unit.

An example of such displays are electronic flight indicators which are required on most aircraft, to inform the pilot and, if applicable, the co-pilot of the aircraft, of various information to assist in flying the aircraft. Military aircraft, commercial aircraft and even personally owned airplanes include electronic flight indicators in the instrument panels of the aircraft. Two common electronic flight indicators are: a horizontal situation indicator ("HSI"); and, an attitude direction indicator ("ADI"). For many years HSI and ADI have consisted of electro-mechanical devices which use several internal gears powered by an electric motor(s) to drive the displays seen on the screen.

Most military and commercial aircraft of today have a standard aircraft instrument panel dimension for each flight indicator. This is sometimes referred to as an ARINC cutout. In certain aircraft the ARINC cutout for an ADI or HSI has already been predetermined by industry standards.

Known flight indicators have maintained one function for each indicator unit. For example, an HSI unit has been known to be a unique display indicator in comparison to an ADI unit. Due to the complexity involved in generating a particular display on the viewing screen of such a unit, known display indicators have been limited to just one type of display Therefore, HSI units have been separate from ADI units which also have been separate from radar units, etc. For a variety of reasons it would be advantageous to have a multifunctional display indicator. First, purchasing and inventory management would be simpler since there would be less part numbers to have in stock. Second, replacement of a unit would be faster and more reliable especially in a stressful situation such as during war. Instead of potential mixups with part numbers, one unit would serve two or more functions. Third, instead of technicians having to learn to repair several different display indicators they can learn the workings of just one.

The present invention comprises an electronic liquid crystal display indicator having self-contained multiple functions. The indicator of the present invention is capable of use as an HSI unit and as an ADI unit. It may also be adapted to offer radar or other functions. By use of a unique adapter cable which is connected to the display indicator and is connected to existing aircraft wiring, an HSI display may be viewed on the unit. By use of a second unique adapter cable which also connects to existing aircraft wiring an ADI display may be visible on the unit. The unit recognizes the incoming signals from the existing aircraft wiring (from various sensors on the aircraft known to those of ordinary skill in the art) connected to the unique adapter cable to determine whether an HSI display or an ADI display is to be generated.

To help maintain the size of the unit to reside in a standard ARINC cutout, the different indicator displays (HSI or ADI, for example) of the present invention preferably use some of the same incoming signals. By sharing signals less space is needed for the additional hardware that would be required if the signals for each indicator display were all unique. The present invention may also utilize surface mount electronic components on circuit boards to conserve space. Very large scale integration ("VLSI") may also be used incorporating programmable logic devices within the unit. Furthermore, a unique interior layout of all components inside the unit enables multifunctional capability within space limitations set by the aircraft industry. The present invention also comprises a graphics processor which drives the display viewed by the operator.

Internal software within the unit of the present invention first determines whether the incoming signals from the existing aircraft wiring are HSI signals or ADI signals. The software then facilitates the reading of all signals coming into the unit from the harness or cable. The software assembles the signals into packets of information and sends these packets to the graphics processor. The packets of information tell the graphics processor to display either an ADI or an HSI. The graphics processor then facilitates the "drawing" of the display on the viewing area of the LCD glass providing a graphical representation of the signals.

Obvious modifications to the present invention are expected to fall within the scope of the claims of the present invention The above stated and other advantages of the present invention will be better understood from the following description of the drawings and detailed description of the preferred embodiment(s).

BRIEF DESCRIPTION OF THE DRAWINGS

FIGS. 5A–5H are a diagramatical representation of a flow chart of software modules and functions of a preferred embodiment of the present invention.

DETAILED DESCRIPTION OF PREFERRED EMBODIMENT(S)

The ADI and HSI of the present invention incorporate liquid crystal display ("LCD") technology, known to those of ordinary skill in the art, to produce the visible display on the unit. Particularly, the technology may be an active matrix liquid crystal display ("AMLCD") consisting of a series of rows and columns of red, green, and blue dot transistors sandwiched between two glass panels. The liquid crystal display is driven by electronics contained within a body or chassis portion of the ADI or HSI units.

Figure 1:
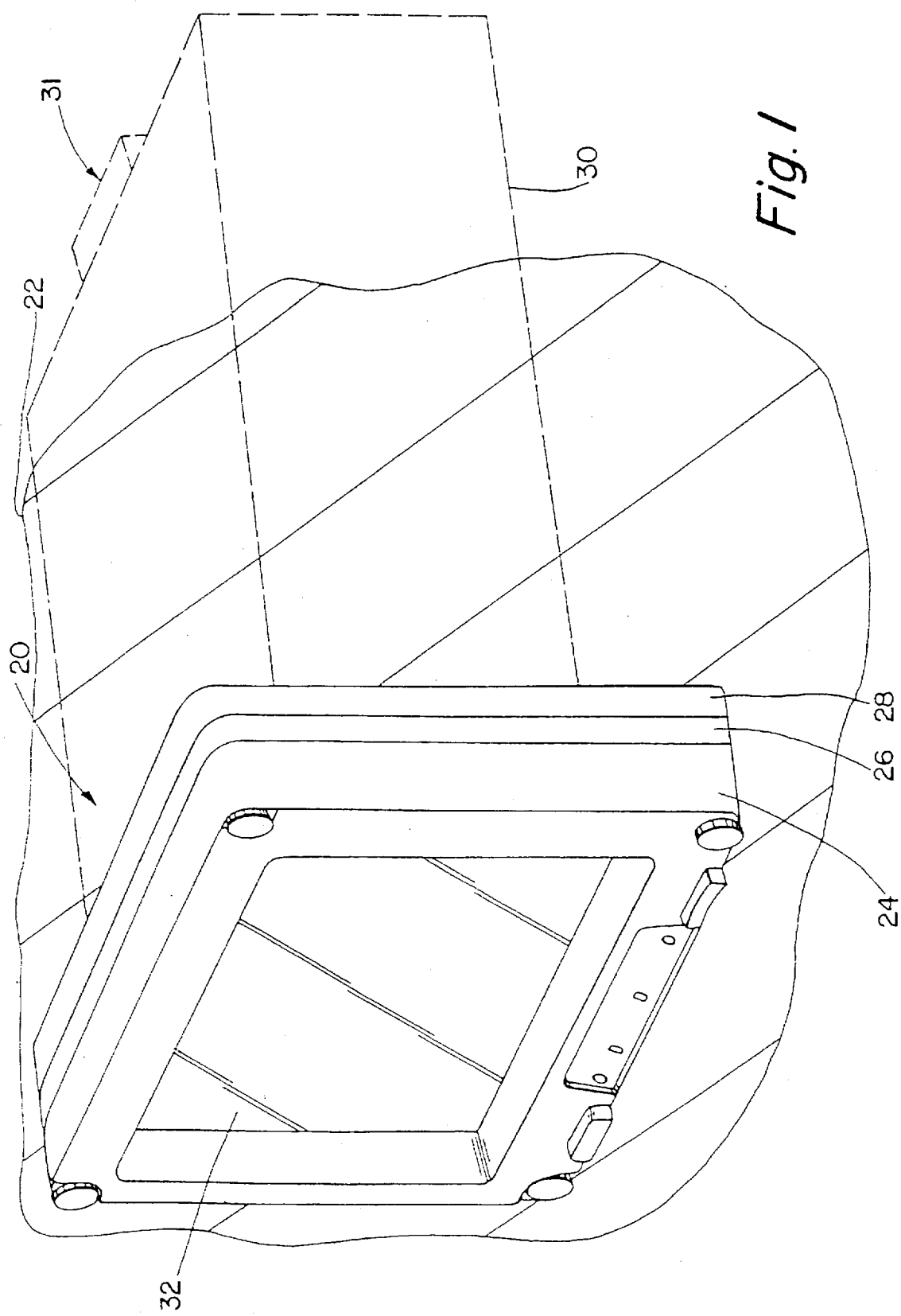
FIG. 1 is a perspective view of an electronic flight indicator of the present invention.
Figure 2:
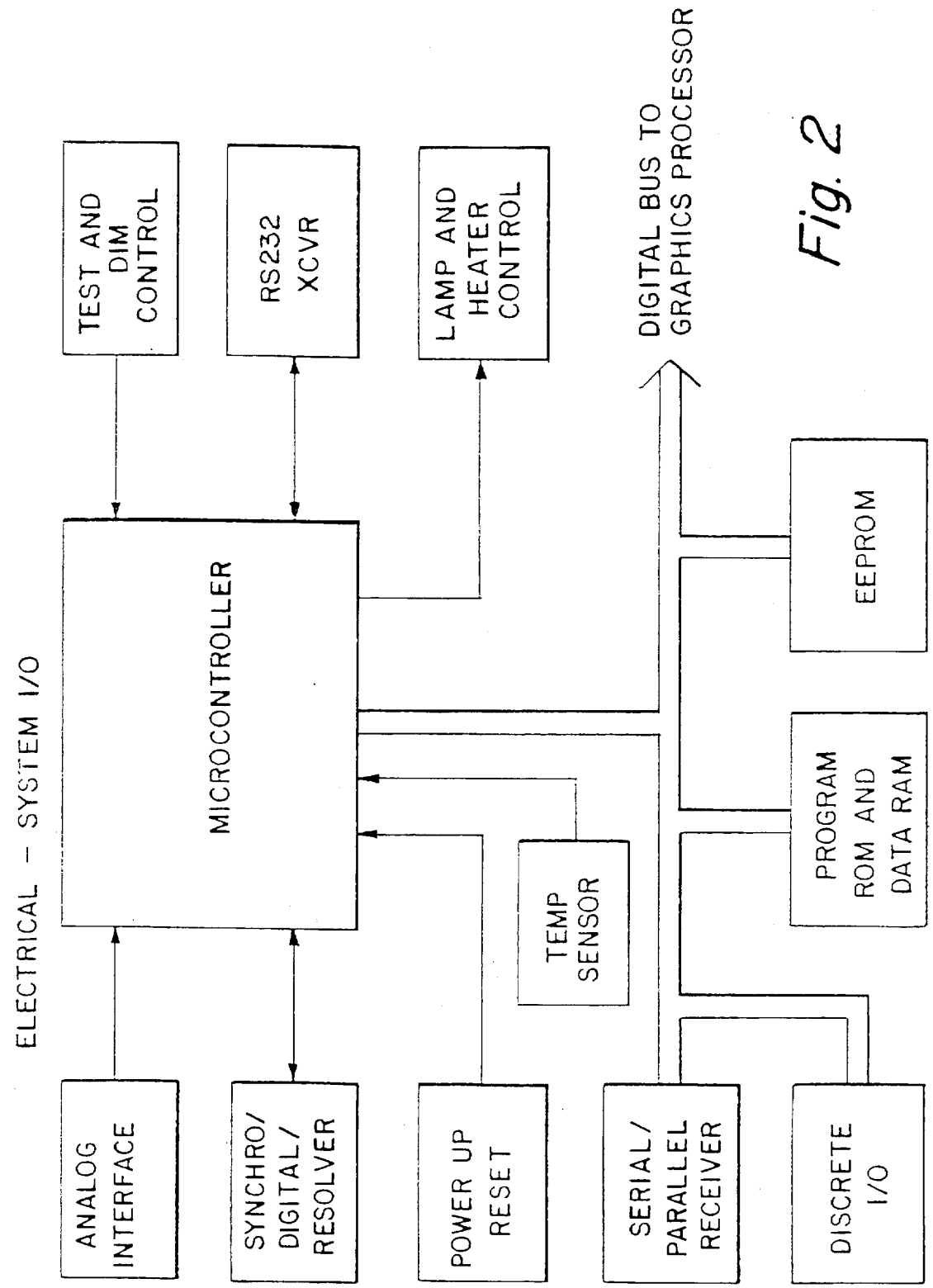
FIG. 2 is a diagramatical representation of a system I/O of the present invention.
Figure 3:
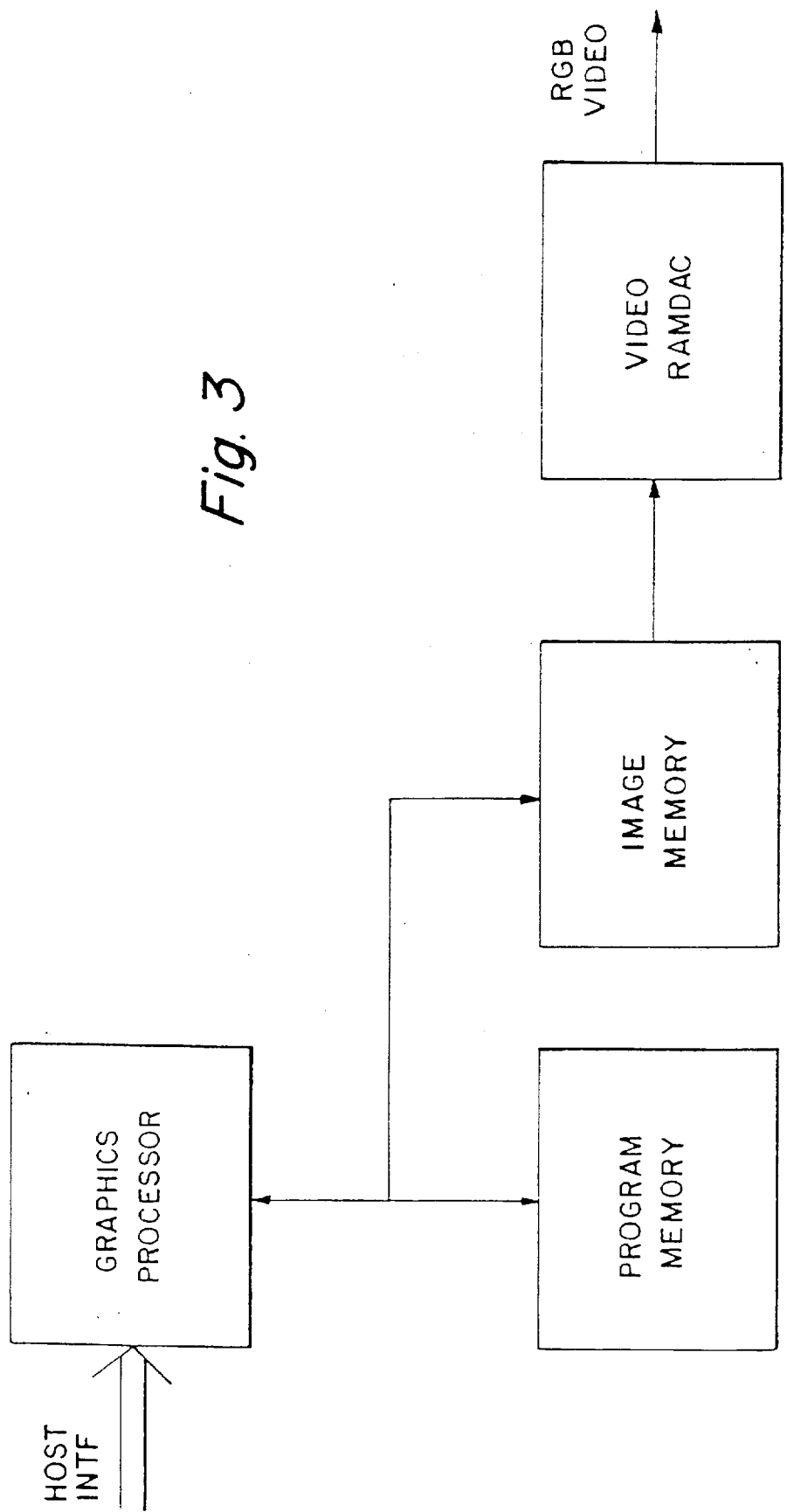
FIG. 3 is a diagramatical representation of the graphics processor function of the present invention.
Figure 4:
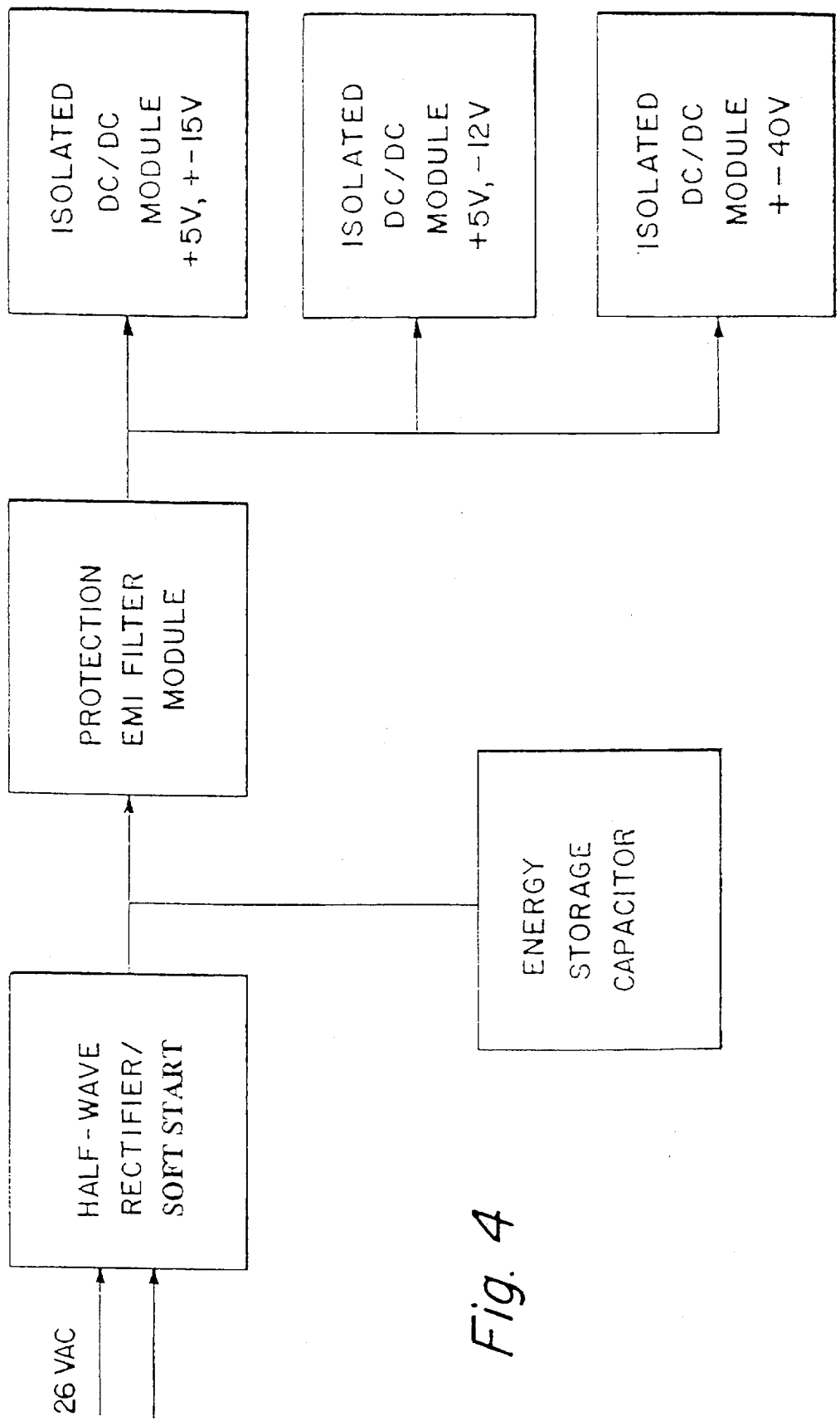
FIG. 4 is a diagramatical representation of a low voltage power supply of the present invention.
Figure 5A:
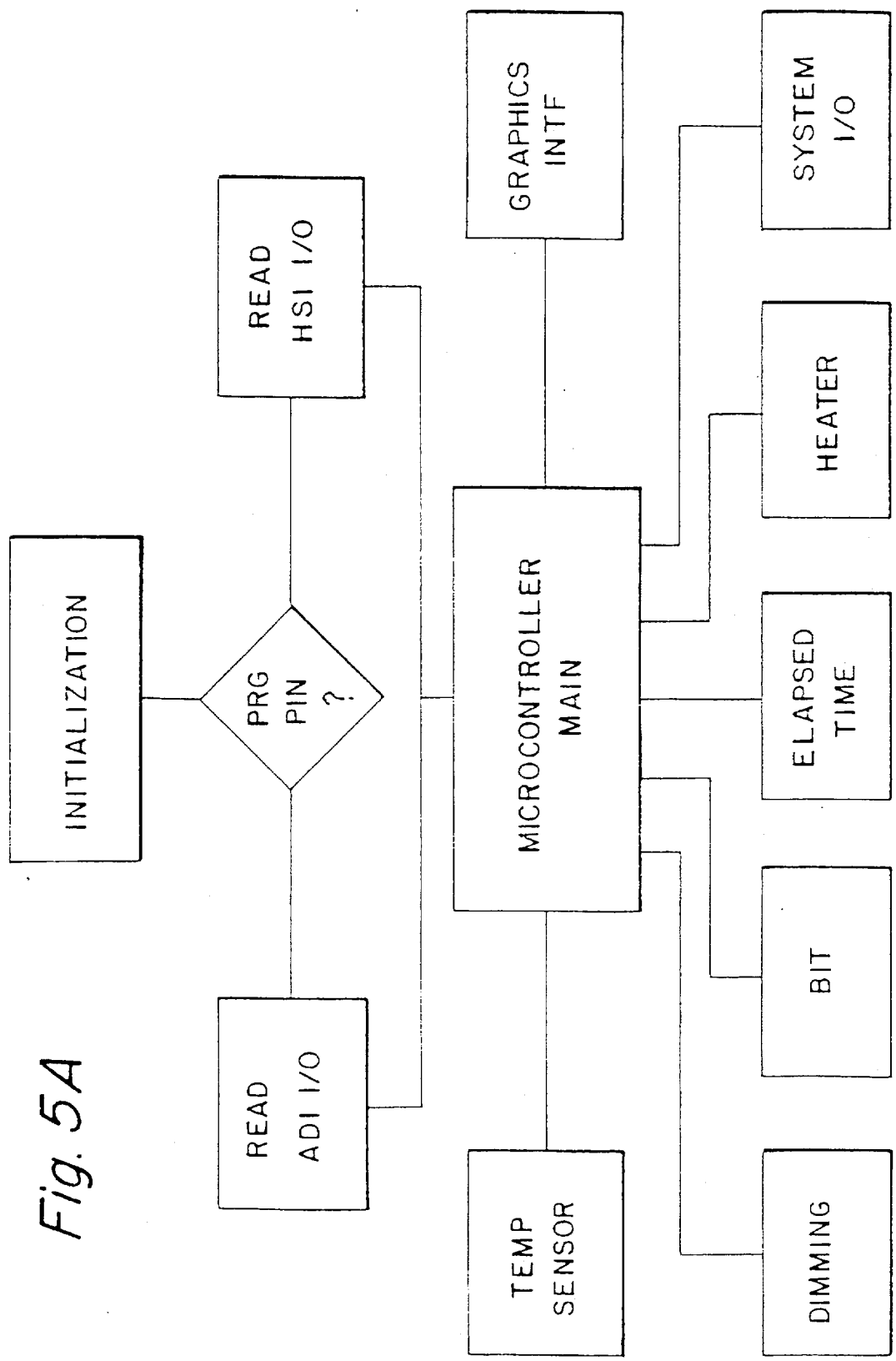
Figure 5B:
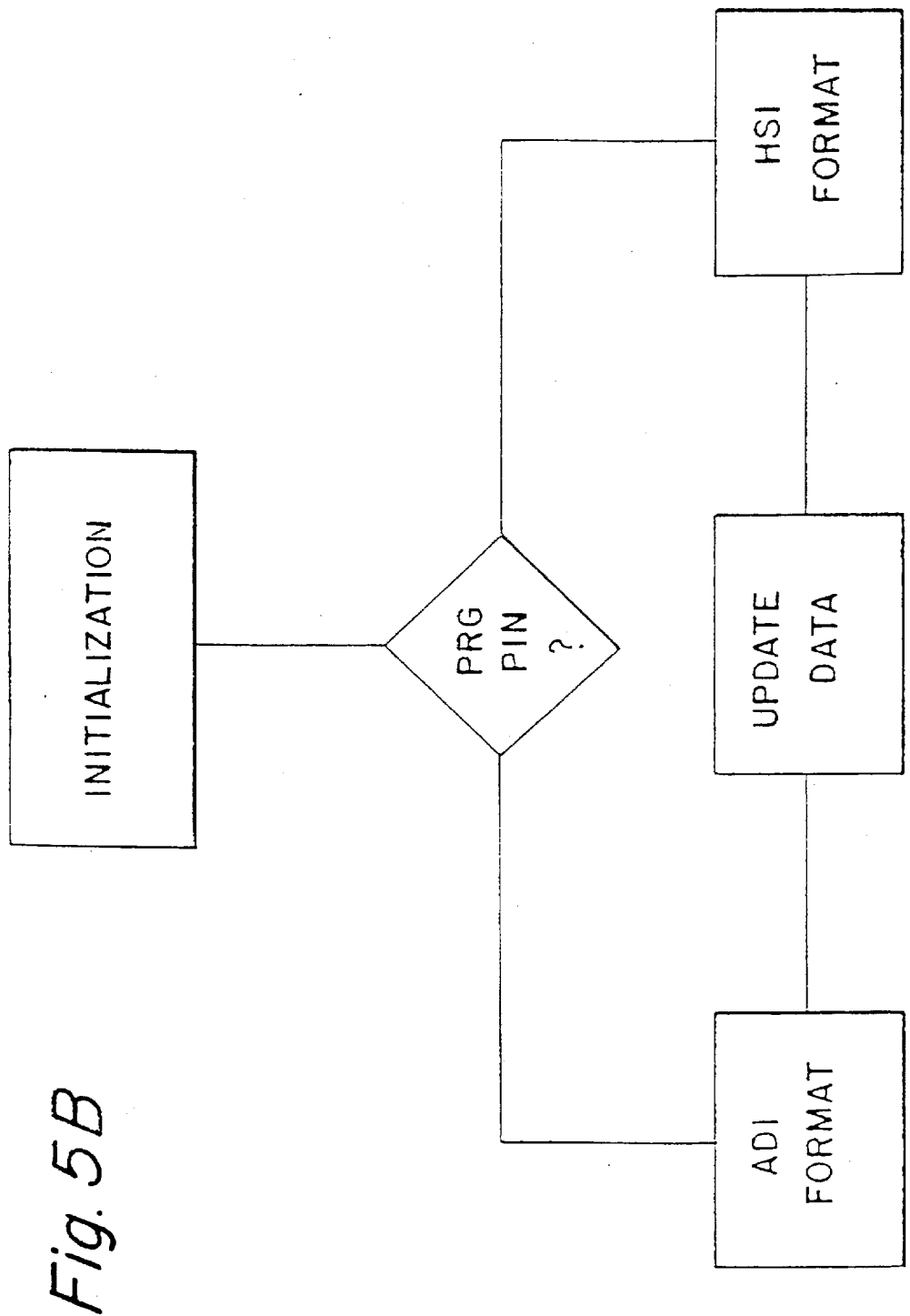

Referring now to the drawings, and particularly FIG. 1, there is shown an electronic flight indicator 20 as it resides in an aircraft instrument panel 22. The indicator 20 may include a bezel 24, a mounting flange 26, an adapter plate 28, and a chassis 30. The unit may receive signals from various devices in the aircraft, process those signals, and produce a display on the viewing screen visible through the opening in the bezel. The bezel resides on the side of the instrument panel closest to the pilot. The chassis resides substantially on the side of the instrument panel opposite the cockpit.

Referring to FIGS. 2-5, there is shown a preferred embodiment of an arrangement of components within the unit. A front lamp module may be provided for lighting the liquid crystal display glass. A low voltage power supply for driving circuit cards within the unit may also be provided. A high voltage power supply may be provided for driving the back lights. A graphics processor is provided for generating the graphical representations via the liquid crystal display which generate guidance information. One preferred graphics processor is a 32 bit graphics processor that may be purchased from Texas Instruments. A system I/O card may also be provided for converting a plurality of analog and digital input signals into all digital output to be sent to the graphics processor. An input card may also be provided which directs electrical power existing on the aircraft to the low voltage power supply. Each unit has a unique wiring harness which contains a predetermined pin connection arrangement which enables the unit to determine whether it is receiving signals to be used in an HSI or in an ADI.

To accomplish the multifunctional capability of the flight indicators of the present invention, space saving techniques were developed to enable the flight indicators to have HSI and ADI capability in a unit that would fit in a standard ARINC cutout. In known HSI units, 75 incoming signals were received. In known ADI units, 75 signals were also received. However, each set of signals were not identical. In the present invention it has been discovered that some of the signals for an HSI unit and some of the signals for an ADI unit may be combined or shared by both. There exists industry standard signals on all aircraft for use in operating the known HSI and ADI units. The industry standard signals are the same for all aircraft but they may occur in different order depending upon the aircraft manufacturer. A partial list of signals is helpful at this time to hereinafter explain the sharing of the signals that can be accomplished with the present invention. In known ADI units there are ten discrete signals. In known HSI units there are nine discrete signals. In ADI units known today there are eight analog signals. In HSI units there are three analog signals. There are two synchro signals in known ADI units, while there are five synchro signals in known HSI units. HSI units also have four resolver output signals and one ARINC serial channel signal.

Since HSI has five synchro signals and ADI needs two synchro signals, ADI can share two of HSI's five synchro pin connections which are electronically operable and compatible. By comparing the amplitudes of HSI and ADI signals, shared signals can be obtained by closely matching amplitudes.

In one preferred embodiment of the present invention three programmable logic devices were incorporated to assist in carrying out the software functions. These PLDs may be purchased from Advanced Micro Devices. ADM part number MACH130 was used for the graphics processor while MACH230 and MACH210 formed a part of the system I/O.

It is thought that the advantages of the present invention will be apparent from the description of the drawings and the preferred embodiments contained herein. It will be appreciated that after reading this specification those of skill in the art will arrive at various modifications to the invention described herein and these modifications are anticipated to fall within the scope of the present invention and the claims contained herein.

What is claimed is:

1. A flight indicator for use as an HSI or an ADI, and for use in an aircraft having electrical wiring for relaying ADI signals and electrical wiring for relaying HSI signals, comprising:

a display;

a predetermined pin connection arrangement on said display having ADI pin connections and HSI pin connections and wherein said pin connection arrangement contains common pin connections for receiving signals common to both ADI and HSI signals;

a processing means in electrical communication with said ADI pin connections and said HSI pin connections, including said common pin connections, of said pin connection arrangement;

wherein said electrical wiring for relaying ADI signals is electrically connected to an ADI adapter for engaging said ADI pin connections, including said common pin connections, of said pin connection arrangement;

wherein said electrical wiring for relaying HSI signals is electrically connected to an HSI adapter for engaging said HSI pin connections, including said common pin connections, of said pin connection arrangement;

wherein said pin connection arrangement is adapted to alternatively engage said ADI adapter or said HSI adapter;

wherein said display is in electrical communication with said processing means; and wherein said flight indicator functions as an ADI when said ADI adapter is engaged to said ADI pin connections, including said common pin connections, on said pin connection arrangement and wherein said flight indicator functions as a HSI when said HSI adapter is engaged to said HSI pin connections, including said common pin connections, of said pin connection arrangement.

2. A flight indicator for use as an HSI or an ADI, and for use in an aircraft having electrical wiring for relaying ADI signals and electrical wiring for relaying HSI signals comprising:

a display;

a predetermined pin connection arrangement on said display having ADI pin connections and HSI pin connections and wherein said pin connection arrangement contains common pin connections for receiving signals common to both ADI and HSI signals; and a processor in electrical communication with said ADI pin connections and said HSI pin connections, including said common pin connections, of said pin connection arrangement;

wherein said electrical wiring for relaying ADI signals is electrically connected to an ADI adapter for engaging said ADI pin connections, including said common pin connections, of said pin connection arrangement;

wherein said electrical wiring for relaying HSI signals is electrically connected to an HSI adapter for engaging said HSI pin connections, including said common pin connections, of said pin connection arrangement;

wherein said pin connection arrangement is adapted to alternatively engage said ADI adapter or said HSI adapter;

wherein said display is in electrical communication with said processor; and wherein said flight indicator functions as an ADI when said ADI adapter is engaged to said ADI pin connections, including said common pin connections, on said pin connection arrangement and wherein said flight indicator functions as a HSI when said HSI adapter is engaged to said HSI pin connections, including said common pin connections, of said pin connection arrangement.

3. A method for alternatively providing an ADI and an HSI display, comprising the steps of:

provividing a display unit having a pin connection arrangement containing ADI pin connections and HSI pin connections, said pin connection arrangement having common pin connections for receiving signals common to both ADI and HSI signals and wherein said pin connection arrangement is adapted to alternatively receive an HSI adapter or an ADI adapter;

connecting said ADI adapter to said ADI and common pin connections of said pin connection arrangement when an ADI display is desired, said ADI adapter being connected to internal aircraft wiring for producing ADI signals;

connecting said HSI adapter to said HSI and common pin connections of said pin connection arrangement when an HSI display is desired, said HSI adapter being connected to internal aircraft wiring for producing HSI signals;

processing signals received at said pin connection arrangement; and displaying an ADI display if ADI signals are received at said pin connection arrangement and displaying an HSI display if HSI signals are received at said pin connection arrangement.

\* \* \* \* \*

UNITED STATES PATENT AND TRADEMARK OFFICE
CERTIFICATE OF CORRECTION

PATENT NO. : 5,896,098
DATED : April 20, 1999
INVENTOR(S) : Goode et al.

It is certified that error appears in the above-identified patent and that said Letters Patent is hereby corrected as shown below:

In Column 1, line 41, please insert a "." after the word "display" and before the word "Therefore".

Signed and Sealed this

Twenty-second Day of May, 2001

*Attest:*

NICHOLAS P. GODICI

*Attesting Officer*   Acting Director of the United States Patent and Trademark Office